United States Patent
Geng et al.

(10) Patent No.: US 10,749,757 B2
(45) Date of Patent: Aug. 18, 2020

(54) METHOD AND APPARATUS FOR GENERATING NETWORK CONTROL POLICY, AND NETWORK CONTROLLER

(71) Applicant: HUAWEI TECHNOLOGIES CO., LTD., Shenzhen, Guangdong (CN)

(72) Inventors: Yanhui Geng, Montreal (CA); Zhitang Chen, Shenzhen (CN); Baofeng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 233 days.

(21) Appl. No.: 15/903,051

(22) Filed: Feb. 23, 2018

(65) Prior Publication Data
US 2018/0183683 A1    Jun. 28, 2018

Related U.S. Application Data

(63) Continuation of application No. PCT/CN2016/095696, filed on Aug. 17, 2016.

(30) Foreign Application Priority Data

Aug. 24, 2015   (CN) .......................... 2015 1 0524510

(51) Int. Cl.
*H04L 12/24*   (2006.01)
*H04L 12/26*   (2006.01)

(52) U.S. Cl.
CPC ........ *H04L 41/147* (2013.01); *H04L 41/0816* (2013.01); *H04L 41/0893* (2013.01);
(Continued)

(58) Field of Classification Search
CPC ... H04L 41/147; H04L 43/0876; H04L 43/08; H04L 43/0811; H04L 43/0882;
(Continued)

(56) References Cited

U.S. PATENT DOCUMENTS 7,225,250 B1 *  5/2007  Harrop ................ H04L 41/0681
                                                        709/223
7,917,954 B1 *  3/2011  Zaitsev ............... G06F 11/3051
                                                         726/23
(Continued)

FOREIGN PATENT DOCUMENTS

CN       101075917 A     11/2007
CN       101808244 A      8/2010
(Continued)

OTHER PUBLICATIONS

Justin A. Boyan et al. Packet Routing in Dynamically Changing Networks: A Reinforcement Learning Approach, NIPS Conference. 1994. pp. 671-678.
(Continued)

*Primary Examiner* — Patrice L Winder
(74) *Attorney, Agent, or Firm* — Huawei Technologies Co., Ltd.

(57) ABSTRACT

A method for use by a network controller is provided. The controller collects network status data of a current moment, and estimates network status information of the current moment according to the network status data of the current moment. The controller predicts network status information of a next moment according to the network status information of the current moment. The controller receives and preprocessing a dataflow entering the network at the current moment, to obtain a preprocessing result of the dataflow. The controller generates a control action by using a network control policy of the current moment and according to the network status information of the current moment, the predicted network status information of the next moment, and the preprocessing result of the dataflow. The controller obtains feedback information of the network resulted from
(Continued)

the control action, and generates a network control policy of the next moment.

18 Claims, 6 Drawing Sheets

(52) U.S. Cl.
CPC ........ *H04L 43/065* (2013.01); *H04L 43/0876* (2013.01); *H04L 41/0823* (2013.01)

(58) Field of Classification Search
CPC . H04L 43/065; H04L 43/062; H04L 41/0893; H04L 41/0816; H04L 41/0823; H04L 41/14
See application file for complete search history.

(56) References Cited

U.S. PATENT DOCUMENTS

| | | | | |
|---|---|---|---|---|
| 8,621,477 | B2* | 12/2013 | Ferdous | G06F 11/3442 718/104 |
| 9,137,130 | B2* | 9/2015 | Driesen | H04L 43/0876 |
| 9,176,789 | B2* | 11/2015 | Lowes | G06F 9/5083 |
| 9,736,041 | B2* | 8/2017 | Lumezanu | H04L 43/04 |
| 9,742,690 | B2* | 8/2017 | Parikh | H04L 47/78 |
| 9,936,406 | B2* | 4/2018 | Andersson | H04L 41/5003 |
| 2005/0137764 | A1 | 6/2005 | Alvarez-Troncoso et al. | |
| 2006/0074875 | A1 | 4/2006 | Faunce et al. | |
| 2009/0274045 | A1 | 11/2009 | Meier et al. | |
| 2009/0307777 | A1 | 12/2009 | He et al. | |
| 2014/0233389 | A1 | 8/2014 | Bantukul et al. | |
| 2015/0113132 | A1 | 4/2015 | Srinivas et al. | |
| 2016/0219080 | A1 | 7/2016 | Huang et al. | |

FOREIGN PATENT DOCUMENTS

| | | |
|---|---|---|
| CN | 102510572 A | 6/2012 |
| CN | 103491571 A | 1/2014 |
| CN | 103731854 A | 4/2014 |
| CN | 104104718 A | 10/2014 |
| CN | 104283946 A | 1/2015 |
| CN | 104468253 A | 3/2015 |
| CN | 104734957 A | 6/2015 |
| DE | 102004053608 A1 | 8/2005 |

OTHER PUBLICATIONS

You Ke-You et al, Survey of Recent Progress in Networked Control Systems. Acta Automatica Sinica, vol. 39, No. 2, Feb. 2013, 18 pages, translated abstract.

* cited by examiner

METHOD AND APPARATUS FOR GENERATING NETWORK CONTROL POLICY, AND NETWORK CONTROLLER

CROSS-REFERENCE TO RELATED APPLICATIONS

This application is a continuation of International Application No. PCT/CN2016/095696, filed on Aug. 17, 2016, which claims priority to Chinese Patent Application No. 201510524510.3, filed on Aug. 24, 2015. The disclosures of the aforementioned applications are hereby incorporated by reference in their entireties.

TECHNICAL FIELD

Embodiments of the present application relate to the field of network data routing, and more specifically, to generating and updating network control policy.

BACKGROUND

A conventional process for generating a network control policy is to convert a problem into a series of optimizations. Inputs for the optimizations are topology structure of the network, link bandwidths in the network, traffic matrix of the network, and the like. Results of the optimizations are generally an optimized end-to-end path of the network, an optimized transmission rate at a transmitting end, etc. The conventional method for generating a network control policy has the following disadvantages: 1. Optimizations are generally obtained by means of linear planning or integer planning. Limited by complexity of the linear planning or the integer planning, scalability of the method is relatively poor. Especially, as quantities of network elements, service types, and traffic increase constantly, an optimization solution may become too complex to be implemented or may require an excessively high cost (such as calculation time). In addition, it is difficult to achieve dynamic instant policy adjustment based on offline optimization; 2. When network configuration such as topology changes (nodes increase or decrease), the optimization needs to be performed again. Re-performing the optimization, on one hand, is markedly hysteretic, and on the other hand, a large amount of manpower is needed to make an optimized model adapted to the new scenario. Due to the above disadvantages, conventional method for generating a network control policy results in low efficiency in network control.

SUMMARY

Embodiments of the present application provide a method for generating a network control policy. The method is self-learning, and the network control policy can be adaptively and dynamically adjusted.

According to a first aspect, an embodiment of the present application provides a method for generating a network control policy. The method can be applied to a software-defined networking (SDN) network, and includes:

obtaining network status data of the network;

estimating network status information according to the network status data, and predicting next-moment status information of the network according to the network status information, where the network status information is used to describe a network link status of the network, a network element queue status in the network, and a network data flow distribution status of the network;

receiving a data flow currently entering the network, and preprocessing the data flow, to obtain a preprocessing result of the data flow;

generating a control action by using a current network control policy and according to the network status information, the next-moment status information of the network, and the preprocessing result of the data flow;

controlling the network according to the control action, and obtaining feedback information of the network controlled according to the control action; and adjusting the current network control policy in real time according to the feedback information, to obtain a next-moment network control policy.

With reference to the first aspect, in a first possible implementation manner of the first aspect, the network status data includes current status data of the network, the network status information includes current status information of the network, and before the estimating network status information according to the network status data, the method further includes:

sending a status acquisition command; and receiving the current status data of the network acquired according to the status acquisition command; and correspondingly, the estimating network status information according to the network status data specifically includes:

estimating the current status information of the network according to the current status data of the network, where the current status information of the network includes a current link status of the network, a current network element queue status in the network, and a current data flow distribution status of the network.

With reference to the first possible implementation manner of the first aspect, in a second possible implementation manner of the first aspect, the network status information further includes historical status information of the network, and before the predicting next-moment status information of the network according to the network status information, the method further includes:

obtaining the historical status information of the network from a database; and correspondingly, the predicting next-moment status information of the network according to the network status information includes: predicting the next-moment status information of the network according to the current status information of the network and the historical status information of the network.

With reference to any one of the first aspect, the first possible implementation manner of the first aspect, or the second possible implementation manner of the first aspect, in a third possible implementation manner of the first aspect, the predicting next-moment status information of the network according to the network status information is:

$$\hat{S}_{t+1} = f(S_{t-\tau}, 0 \leq \tau \leq L), \text{ where}$$

$\hat{S}_{t+1}$ represents the next-moment status information of the network, $S_{t-\tau}$ represents the network status information, $0 \leq \tau \leq L$, L is a time window length of the network status information, and f is a linear function or a nonlinear function.

With reference to any one of the first aspect or the first to the third possible implementation manners of the first aspect, in a fourth possible implementation manner of the first aspect, the preprocessing the data flow, to obtain a preprocessing result of the data flow includes:

extracting a feature of the data flow, where the feature includes a packet header 5-tuple, a packet length sequence, or a packet arrival time interval sequence;

performing spatial-temporal data mining processing and/or causal relationship analysis processing on the data flow by using the feature, to obtain a processing result; and labeling the data flow according to the processing result, to obtain a label of the data flow, where the label of the data flow is the preprocessing result of the data flow.

With reference to the fourth possible implementation manner of the first aspect, in a fifth possible implementation manner of the first aspect, the generating a control action by using a current network control policy and according to the network status information, the next-moment status information of the network, and the preprocessing result of the data flow is:

$$a_i \sim \pi_t(a|s_t, \hat{S}_{t+1}, l_i), \text{ where}$$

$\hat{S}_{t+1}$ represents the next-moment status information of the network, $S_t$ represents the network status information, $l_i$ represents the label of the data flow, i represents an $i^{th}$ data flow, $\pi_t$ represents the current network control policy, $\pi_t(a|s_t, \hat{S}_{t+1}, l_i)$ represents probability distribution of a under the current network control policy using $\hat{S}_{t+1}$, $S_t$, and $l_i$ as conditional variables, a is a control variable, and random sampling is performed in the probability distribution of the control variable a, to obtain the control action $a_i$.

According to a second aspect, an embodiment of the present application provides a method for generating a network control policy. The method can be applied to an SDN network, and includes:

receiving network status information of the network, next-moment status information of the network, and a preprocessing result of a data flow, where the network status information is used to describe a network link status of the network, a network element queue status in the network, and a network data flow distribution status of the network, the next-moment status information of the network is obtained through prediction according to the network status information, and the preprocessing result of the data flow is obtained by preprocessing a data flow currently entering the network;

generating a control action by using a current network control policy and according to the network status information, the next-moment status information of the network, and the preprocessing result of the data flow, where the control action is used to control the network, to obtain feedback information of the network controlled according to the control action; and receiving the feedback information of the network, and adjusting the current network control policy in real time according to the feedback information, to obtain a next-moment network control policy.

With reference to the second aspect, in a first possible implementation manner of the second aspect, the next-moment status information of the network is obtained through prediction according to the network status information, and a method for the prediction is:

$$\hat{S}_{t+1} = f(S_{t-\tau}, 0 \leq \tau \leq L), \text{ where}$$

$\hat{S}_{t+1}$ represents the next-moment status information of the network, $S_{t-\tau}$ represents the network status information, $0 \leq \tau \leq L$, L is a time window length of the network status information, and f is a linear function or a nonlinear function.

With reference to the second aspect or the first possible implementation manner of the second aspect, in a second possible implementation manner of the second aspect, the preprocessing result of the data flow is obtained by preprocessing the data flow currently entering the network, and a method for the preprocessing includes:

extracting a feature of the data flow, where the feature includes a packet header 5-tuple, a packet length sequence, or a packet arrival time interval sequence;

performing spatial-temporal data mining processing and/or causal relationship analysis processing on the data flow by using the feature, to obtain a processing result; and labeling the data flow according to the processing result, to obtain a label of the data flow, where the label of the data flow is the preprocessing result of the data flow.

According to a third aspect, an embodiment of the present application provides a method for generating a network control policy. The method can be applied to an SDN network, and includes: receiving feedback information from the SDN network, and forwarding the feedback information to a control module, so that the control module adjusts a current network control policy in real time according to the feedback information, to obtain a next-moment network control policy. The feedback information is obtained by controlling the network according to a control action generated by the control module during running of the network at a previous moment.

According to a fourth aspect, an embodiment of the present application provides an apparatus for generating a network control policy. The apparatus can be used in an SDN network, and it includes:

an obtaining module, configured to obtain network status data of the network;

a prediction module, configured to: estimate network status information according to the network status data, and predict next-moment status information of the network according to the network status information, where the network status information is used to describe a network link status of the network, a network element queue status in the network, and a network data flow distribution status of the network;

a flow data preprocessing module, configured to: receive a data flow currently entering the network, and preprocess the data flow, to obtain a preprocessing result of the data flow;

a control module, configured to generate a control action by using a current network control policy and according to the network status information, the next-moment status information of the network, and the preprocessing result of the data flow;

an execution module, configured to control the network according to the control action, and obtain feedback information of the network controlled according to the control action, where the control module is further configured to: receive the feedback information of the network, and adjust the current network control policy in real time according to the feedback information, to obtain a next-moment network control policy.

With reference to the fourth aspect, in a first possible implementation manner of the fourth aspect, the network status data includes current status data of the network, the network status information includes current status information of the network, and the prediction module is specifically configured to:

send a status acquisition command;

receive the current status data of the network acquired according to the status acquisition command; and estimate the current status information of the network according to the current status data of the network, where the current status information of the network includes a current link status of the network, a current network element queue status in the network, and a current data flow distribution status of the network.

With reference to the first possible implementation manner of the fourth aspect, in a second possible implementation manner of the fourth aspect, the network status information further includes historical status information of the network. The prediction module is further configured to: obtain the historical status information of the network from a database, and predict the next-moment status information of the network according to the current status information of the network and the historical status information of the network.

With reference to any one of the fourth aspect, the first possible implementation manner of the fourth aspect, or the second possible implementation manner of the fourth aspect, in a third possible implementation manner of the fourth aspect, the prediction module is specifically configured to:

$\hat{S}_{t+1}=f(S_{t-\tau},0\le\tau\le L)$, where $\hat{S}_{t+1}$ represents the next-moment status information of the network, $S_{t-\tau}$ represents the network status information, $0\le\tau\le L$, L is a time window length of the network status information, and f is a linear function or a nonlinear function.

With reference to any one of the fourth aspect or the first to the third possible implementation manners of the fourth aspect, in a fourth possible implementation manner of the fourth aspect, the flow data preprocessing module includes:

an extraction unit, configured to extract a feature of the data flow, where the feature includes a packet header 5-tuple, a packet length sequence, or a packet arrival time interval sequence;

a mining analysis unit, configured to perform spatial-temporal data mining processing and/or causal relationship analysis processing on the data flow by using the feature, to obtain a processing result; and a labeling unit, configured to label the data flow according to the processing result, to obtain a label of the data flow, where the label of the data flow is the preprocessing result of the data flow.

With reference to the fourth possible implementation manner of the fourth aspect, in a fifth possible implementation manner of the fourth aspect, the control module is specifically configured to:

$a_t \sim \pi_t(a|s_t,\hat{S}_{t+1},l_i)$, where $\hat{S}_{t+1}$ represents the next-moment status information of the network, $S_t$ represents the network status information, $l_i$ represents the label of the data flow, i represents an $i^{th}$ data flow, $\pi_t$ represents the current network control policy, $\pi_t(a|s_t,\hat{S}_{t+1},l_i)$ represents probability distribution of a under the current network control policy using $\hat{S}_{t+1}$, $S_t$, and $l_i$ as conditional variables, a is a control variable, and random sampling is performed in the probability distribution of the control variable a, to obtain the control action $a_t$.

According to a fifth aspect, an embodiment of the present application provides an apparatus for generating a network control policy. The apparatus can be used in an SDN network, and it includes:

a receiving module, configured to receive network status information of the network, next-moment status information of the network, and a preprocessing result of a data flow, where the network status information is used to describe a network link status of the network, a network element queue status in the network, and a network data flow distribution status of the network, the next-moment status information of the network is obtained through prediction according to the network status information, and the preprocessing result of the data flow is obtained by preprocessing a data flow currently entering the network; and a control module, configured to generate a control action by using a current network control policy and according to the network status information, the next-moment status information of the network, and the preprocessing result of the data flow, where the control action is used to control the network, to obtain feedback information of the network controlled according to the control action, where the control module is further configured to: receive the feedback information of the network, and adjust the current network control policy in real time according to the feedback information, to obtain a next-moment network control policy.

With reference to the fifth aspect, in a first possible implementation manner of the fifth aspect, that the next-moment status information of the network is obtained through prediction according to the network status information is specifically:

$\hat{S}_{t+1}=f(S_{t-\tau},0\le\tau\le L)$, where $\hat{S}_{t+1}$ represents the next-moment status information of the network, $S_{t-\tau}$ represents the network status information, $0\le\tau\le L$, L is a time window length of the network status information, and f is a linear function or a nonlinear function.

With reference to the fifth aspect or the first possible implementation manner of the fifth aspect, in a second possible implementation manner of the fifth aspect, that the preprocessing result of the data flow is obtained by preprocessing a data flow currently entering the network specifically includes:

extracting a feature of the data flow, where the feature includes a packet header 5-tuple, a packet length sequence, or a packet arrival time interval sequence;

performing spatial-temporal data mining processing and/or causal relationship analysis processing on the data flow by using the feature, to obtain a processing result; and labeling the data flow according to the processing result, to obtain a label of the data flow, where the label of the data flow is the preprocessing result of the data flow.

According to a sixth aspect, an embodiment of the present application provides a network controller. The network controller can be used in an SDN network, and it is configured to: receive feedback information from the SDN network, and forward the feedback information to a control module, so that the control module adjusts a current network control policy in real time according to the feedback information, to obtain a next-moment network control policy. The feedback information is obtained by controlling the network according to a control action generated by the control module during running of the network at a previous moment.

In the present application, next-moment status information of a network is predicted according to network status information. A data flow currently entering the network is preprocessed, to obtain a preprocessing result of the data flow, so that a control action is generated by using a current network control policy and according to the network status information, the next-moment status information of the network, and the preprocessing result of the data flow. The network is controlled according to the control action, to obtain feedback information, where the feedback information is obtained by controlling the network according to the control action. Finally, the current network control policy is adjusted in real time according to the feedback information, to obtain a next-moment network control policy. In this way, a network control policy is always dynamically optimized and adjusted in real time according to a current data and network status, and this is the so-called self-adaption herein. For each moment, there is an optimal network control policy needed by the network and data at the moment. The network is controlled according to the network control policy updated in real time, to improve network control efficiency.

BRIEF DESCRIPTION OF DRAWINGS

The following briefly describes the accompanying drawings used in describing the embodiments of the present application.

DESCRIPTION OF EMBODIMENTS

The following describes the technical solutions in the embodiments of the present application with reference to the accompanying drawings.

Figure 1:
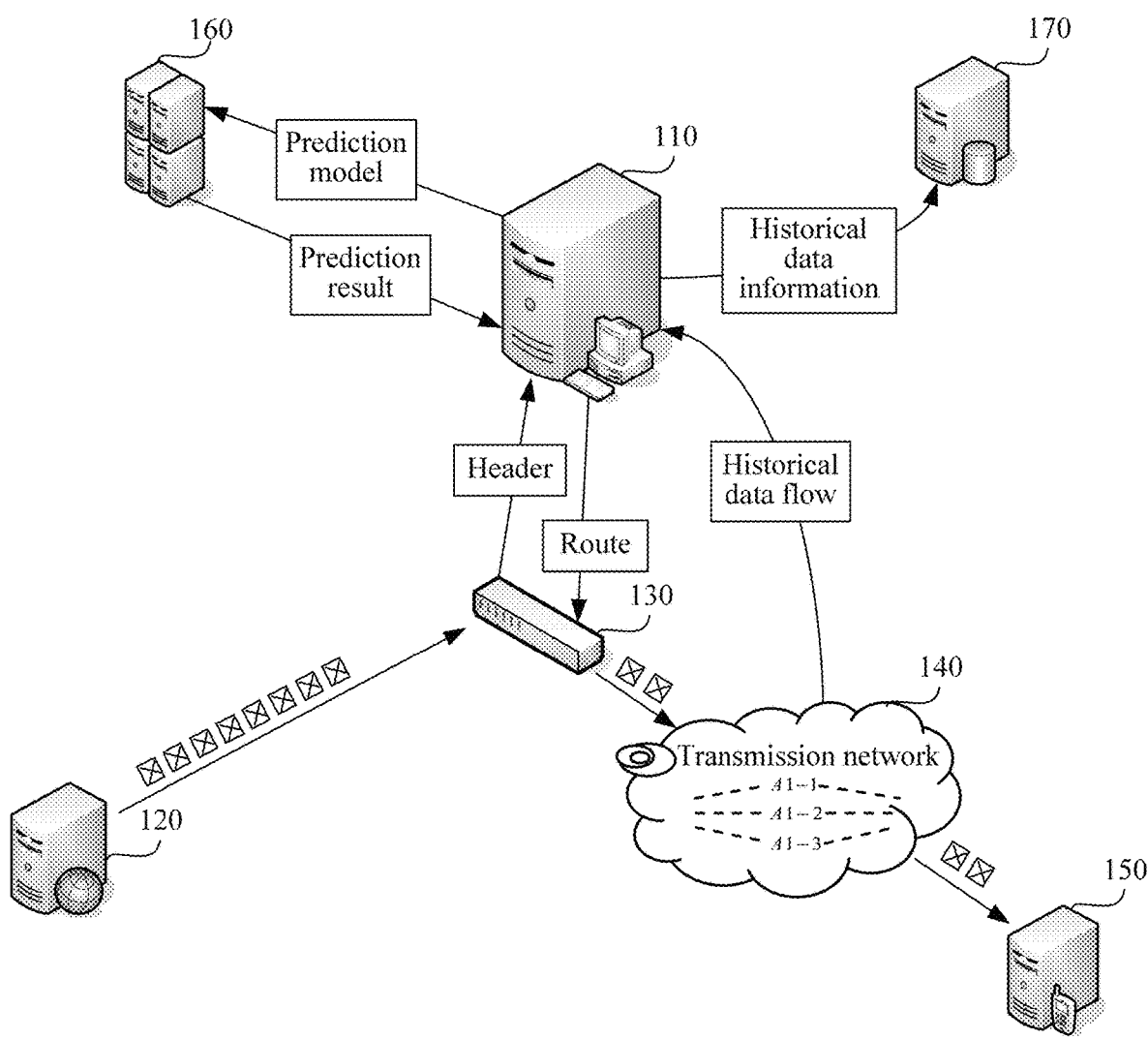
FIG. 1 is an architectural diagram of a data transmission network according to an embodiment of the present application.

Methods for generating a network control policy provided in embodiments of the present application may be deployed and implemented in a data transmission network. An example of the data transmission network 100 is shown in FIG. 1. The data transmission network 100 includes a central control server 110, a source server 120, a network switch 130, a transmission network 140, a client device 150, a prediction server 160, and a training server 170.

The central control server 110 is a core processing device of the data transmission network 100. The central server 110 is separately interconnected to the network switch 130, the transmission network 140, the client device 150, the prediction server 160, and the training server 170. The central server 110 is configured to perform information exchange, instruction transfer, and network data transmission with the network switch 130, the transmission network 140, the training server 170, and the prediction server 160. In addition, the source server 120, the network switch 130, the transmission network 140, the client device 150, the training server 170, and the prediction server 160 may be interconnected according to different service requirements and function requirements, and perform information and instruction interaction. In the following, functions and compositions of the devices are described in detail.

The central control server 110 includes main components such as a processor, a storage device, and a data interface. By invoking a processing program stored in the storage device, the processor performs a corresponding processing function. The data interface is mainly responsible for data receiving/transmitting between components inside the central control server 110 and between the central control server 110 and an external component. The processor may be a general purpose processor, a digital signal processor (DSP), an application specific integrated circuit (ASIC), a field programmable gate array (FPGA), or another kind of programmable logical device, discrete gate or transistor logic device, or discrete hardware component. The processor may further be any device that is capable of implementing or executing methods, steps, and logic block diagrams that are disclosed in the following embodiments of the present application. The general purpose processor may be a microprocessor, or may be any conventional processor. Steps in the methods disclosed with reference to the embodiments of the present application may be directly executed and completed by a hardware decoding processor, or may be executed and completed by using a combination of hardware and software modules in the processor. The software module may be located in a mature storage medium in the art, such as a random access memory (RAM), a flash memory, a read-only memory (ROM), a programmable read-only memory or an electrically erasable programmable memory, or a register.

The central control server 110 receives, by using the data interface, a routing request from the network switch 130. The routing request includes information about a current data flow that is to be routed. The central control server 110 sends the information about the current data flow in the routing request to the prediction server 160 by using the data interface. The prediction server 160 predicts next-moment status information of the network according to the information about the current data flow, and sends the predicted next-moment status information to the central control server 110. The processor of the central control server 110 invokes a processing program prestored in the memory, and generates a control action according to the prediction result returned by the prediction server 160 and an current network control policy stored in the memory. The control action includes an optimal transmission path that matches a type of the current data flow. Then, the central control server 110 configures a route for the current data flow according to the optimal transmission path, and sends the configured route to the network switch 130. In addition, the central control server 110 collects from the network switch 130, information about historical data flows that have been routed reported by the network switch 130. The central control server 110 further obtains feedback information according to before routing data and after routing data, and sends the feedback information to the training server 170. The training server 170 adjusts the current network control policy in real time according to the feedback information, to obtain a network control policy for the next moment.

The source server 120 includes main components such as a processor, a memory, and a data interface. The source server sends, by using the data interface, data stored in the memory to the client device 150 through the network switch 130 and the transmission network 140.

The network switch 130 extracts a header of the first data packet of a current data flow that newly enters the network, reports the header to the central control server 110, and, after a wait, forwards data packets of the current data flow according to a route calculated and configured by the central control server 110. In addition, the network switch 130 collects the information about historical data flows that have been routed, and reports the information to the central control server 110.

The transmission network 140 includes multiple network nodes interconnected by transmission cables, and it transmits data according to instructions of the network switch 130.

The client device 150 includes components such as a processor, a memory, and a data interface. The client device 150 sends a data request of a client to the source server 120 through the data interface and the network switch 130, and stores, in the memory, data content received from the source server 120 through the network switch 130 and the transmission network 140.

The prediction server 160 may be an independent processing device, and includes a processor, memory, and data interface. The processor invokes a processing program stored in the memory to process the information about the current data flow received through the data interface, predicts the next-moment status information of the network, and sends the predicted next-moment status information of the network to the central control server 110 through the data interface. The information about the current data flow is from the central control server 110.

Alternatively, the prediction server 160 may also be a working unit attached to the central control server 110. In other words, the prediction server 160 and the central control server 110 share a same memory and a same data interface, but use different processors. In this case, data transmission between the prediction server 160 and the central control server 110 is performed by using a data bus inside the central control server 110.

Further, the prediction server 160 may also share a same processor with the central control server 110, and a manner of the sharing may be performing synchronous processing (parallel processing) or asynchronous processing (time-division processing) by using different processing resources in the processor, or performing asynchronous processing (time-division processing) by using a same processing resource in the processor.

Still further, the prediction server 160 may also be implemented by using a virtual machine. In doing so, the central control server 110 simulates, by using the processor, the memory, and the data interface of the central control server 110 and by invoking a program stored in the memory, a complete computer system that has a complete hardware system function and that runs in a fully isolated environment. The computer system may independently complete all work that the prediction server 160 needs to complete, without affecting running of the central control server 110. It may be understood that the prediction server 160 may further be simplified as a software program stored in the memory of the central control server 110. The central control server 110 invokes software program at a proper time, to implement a function of predicting the next-moment status information of the network.

The training server 170 may be an independent processing device, and includes main components such as a processor, a memory, and a data interface. The processor adjusts, in real time according to the received feedback information, the current network control policy that is invoked and that is stored in the memory, obtains the next-moment network control policy, and stores the next-moment network control policy in the memory, for invoking in a next circulation.

Like the prediction server 160, the training server 170, may also be a working unit attached to the central control server 110. In other words, the training server 170 and the central control server 110 share a same memory and a same data interface, but use different processors. In this case, data transmission between the training server 170 and the central control server 110 is performed through the data bus inside the central control server 110. In addition, the training server 170 may share a same processor with the central control server 110, and a manner of the sharing may be performing synchronous processing (parallel processing) or asynchronous processing (time-division processing) by using different processing resources in the processor, or performing asynchronous processing (time-division processing) by using a same processing resource in the processor.

In addition, the training server 170 may also be implemented by using a virtual machine. In doing so, the central control server 110 simulates, by using the processor, the memory, and the data interface of the central control server 110 and by invoking a program stored in the memory, a complete computer system that has a complete hardware system function and that runs in a fully isolated environment. The computer system may independently complete all work that the training server 170 needs to complete. It may be understood that the training server 170 may further be simplified as a software program stored in the memory of the central control server 110. The central control server 110 invokes software program at a proper time, to implement real-time adjustment and real-time updating of the current network control policy.

It should be noted that the foregoing hardware environment is not the only manner of executing the present application, and may be dynamically adjusted according to hardware resources, and service requirements, that is, data transmission requirements. For example, the central control server 110, the network switch 130, the prediction server 160, and the training server 170 are centralized in a data control center, so as to improve processing efficiency.

Embodiment 1

Figure 2:
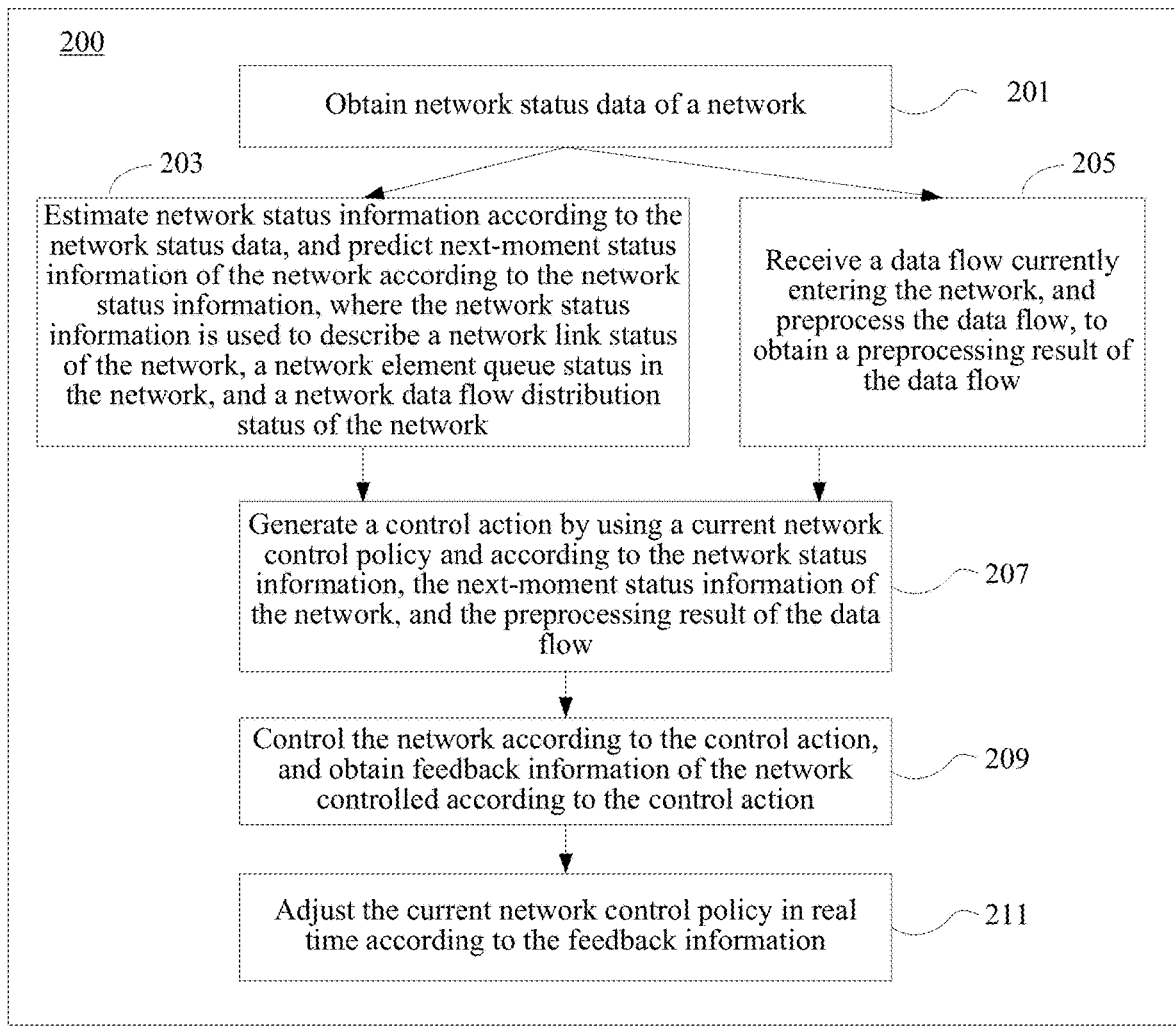
FIG. 2 is a flowchart of a method for generating a network control policy according to a first embodiment of the present application.

FIG. 2 is a flowchart of a method 200 for generating a network control policy according to this embodiment of the present application. The method 200 for generating a network control policy may be applied to an SDN network.

S201. Obtain network status data of the network.

The network status data is original data representing network status.

S203. Estimate network status information according to the network status data, and predict next-moment status information of the network according to the network status information. The network status information describes network link status of the network, network element queue status in the network, and network data flow distribution status of the network.

The network status information having a high-level physical meaning is estimated from the network status data having a low-level physical meaning. The network status information has a time validity. In other words, network status information at a moment t (which may be referred to as a current moment) describes network link status, network element queue status in the network, network data flow distribution status, and the like of the moment t. Network status information at a moment t−1 (which may be referred to as a historical moment) describes network link status, network element queue status in the network, network data flow distribution status, and the like of the t−1 moment. Network status information at a moment t+1 (which may be referred to as a next moment or a future moment) describes network link status, network element queue status in the network, network data flow distribution status, and the like of the t+1 moment. Details are not described herein.

S205. Receive a data flow currently entering the network, and preprocess the data flow, to obtain a preprocessing result of the data flow.

Specifically, the preprocessing may include, but is not limited to, clustering, classification, regression, or causal analysis.

S207. Generate a control action by applying a current network control policy and according to the network status information, the next-moment status information of the network, and the preprocessing result of the data flow.

S209. Control the network according to the control action, and obtain feedback information of the network according to the control action.

S211. Adjust the current network control policy in real time according to the feedback information, to obtain a next-moment network control policy.

It should be noted that in the method 200 for generating a network control policy provided in this embodiment of the present application, steps are described in ascending order of numbers of S201, S203, S205, and the like, but these numbers do not constitute any limitation on a specific step sequence in this solution. For example, in this solution, S203 and S205 are not limited to such a sequence, and S203 and S205 may be performed at the same time, or S203 may be performed before S205, or S203 may be performed after S205. That is, the step sequence in this embodiment of the present application is related to only directions of data flows, but not to a sequence of descriptions.

In this embodiment of the present application, next-moment status information of a network is predicted according to network status information. A data flow currently entering the network is preprocessed, to obtain a preprocessing result of the data flow, so that a control action is generated by using a current network control policy and according to the network status information, the next-moment status information of the network, and the preprocessing result of the data flow. The network is controlled according to the control action, to obtain feedback information, where the feedback information is obtained by controlling the network according to the control action. Finally, the current network control policy is adjusted in real time according to the feedback information, to obtain a next-moment network control policy. When next network data arrives, this process is repeated.

Finally, based on next feedback information, the next-moment network control policy obtained after the current real-time adjustment is further correspondingly adjusted in real time, and the process is repeated. In this way, a network control policy is always dynamically optimized and adjusted in real time according to a current data and network status. This is the so-called self-adaption herein. For each moment, there is an optimal network control policy needed by the network and data at the moment. The network is controlled according to the network control policy updated in real time, to improve network control efficiency.

Figure 3:
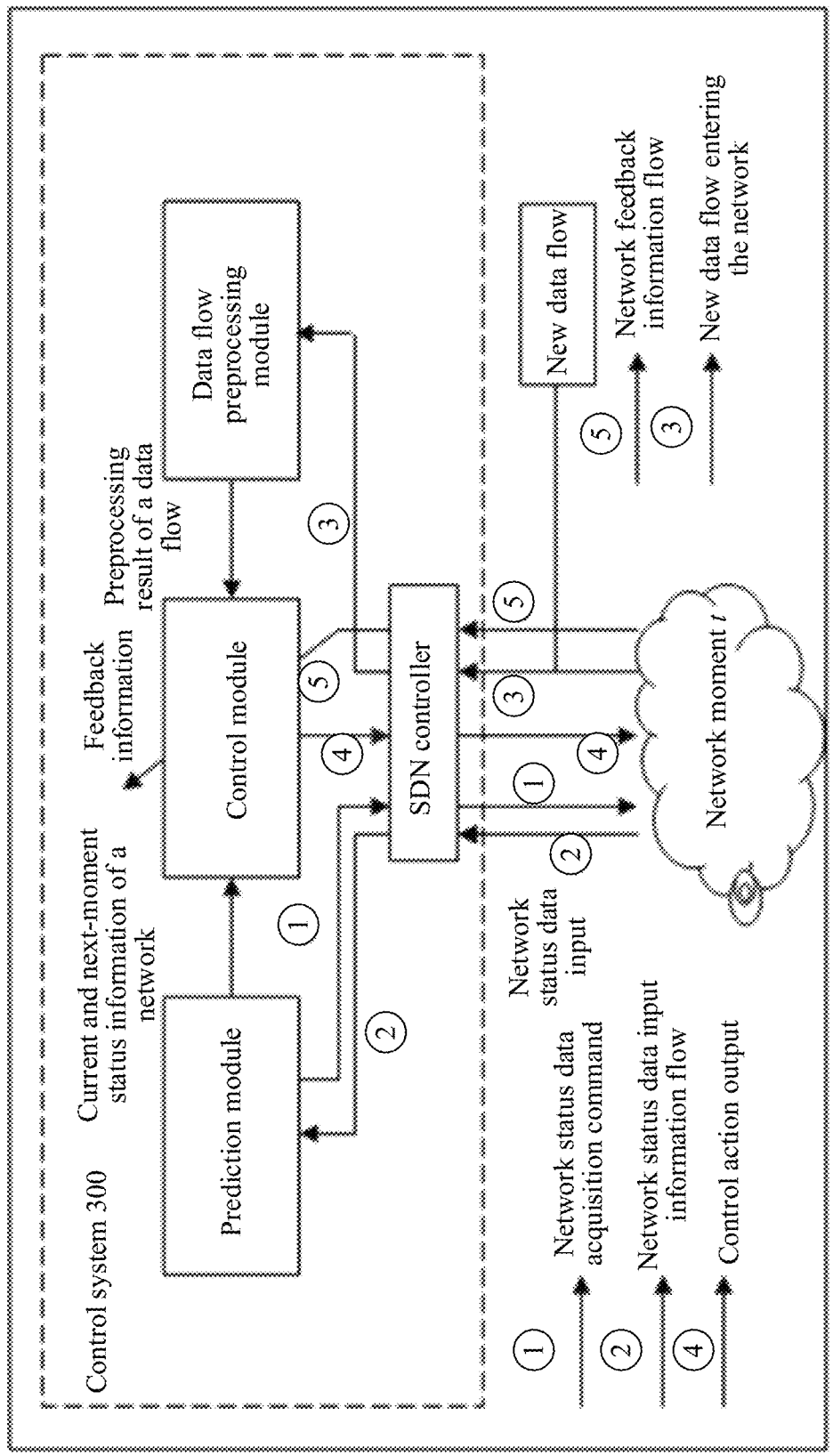
FIG. 3 is a diagram of executing the method for generating a network control policy according to the first embodiment of the present application.

Specifically, the foregoing embodiment may be implemented based on the structure shown in FIG. 3. For example, in a control system 300, a network status data acquisition command (which is represented by a line segment ① in the figure) is periodically or randomly triggered to be sent to a network. An SDN controller collects network status data based on the command and forwards (which is represented by a line segment ② in the figure) the network status data to a corresponding processing apparatus. The corresponding processing apparatus estimates network status information according to the network status data, and predicts next-moment status information of the network according to the network status information. It should be noted that, corresponding to the next-moment status information of the network, the network status information herein is used to describe network status information different from that of the next moment, for example, historical status information of the network or current status information of the network. At a time sequence the same as, earlier than, or later than that of actions such as network status data collection and network status information estimation, the SDN controller forwards (which is represented by a line segment ③ in the figure), to another corresponding processing apparatus in real time, a data flow currently entering the network. The corresponding processing apparatus preprocesses the data flow currently entering the network, to obtain a preprocessing result of the data flow.

It is emphasized that the action of preprocessing the data flow may be performed simultaneously with, earlier than, or later than the actions of estimating the network status information and predicting the next-moment status information of the network, because in running of an actual solution, there is no extra limitation on the sequence of the actions originally. Therefore, the foregoing actions performed according to any sequence are within the protection scope of this embodiment of the present application. Details are not described herein.

The network status information, the next-moment status information of the network, and the preprocessing result of the data flow are used as input information of a control module. In addition, the control module invokes a current network control policy in a cache or a memory, generates a control action according to the current network control policy by using information such as the network status information, the next-moment status information of the network, and the preprocessing result of the data flow, and outputs the control action to the SDN controller (which is represented by a line segment ④ in the figure). The SDN controller executes a specific control command on the network according to the control action. The network feeds back (which is represented by a line segment ⑤ in the figure) a control effect as feedback information to the SDN controller, where the control effect is generated according to the control action. The SDN controller forwards (which is represented by the line segment ⑤ in the figure) the feedback information to the control module.

The control module adjusts the current network control policy in real time according to the feedback information, to obtain a next-moment network control policy, and the cache of the control module temporarily stores the real-time network control policy, or stores the real-time network control policy in the memory, for use in a next circulation. In this way, a control action generated in the first circulation is an optimal control action needed by the network for this circulation moment or period. After the control action is executed, feedback information of this time is generated. A next-moment network control policy is obtained according to the feedback information. The next-moment network control policy enters a next circulation as a current network control policy in the next circulation. In this way, the second circulation, the third circulation, the fourth circulation, and the like are carried out subsequently, to ensure that each current moment has optimal control for a network status and data flow information at the current moment, to improve control efficiency of the entire control system. Details are not described herein.

It should be noted that the structure shown in FIG. 3 is an example of the method, and is not used as the only structure limitation. Generation of a network control policy, network control, or the like performed according to the method 200 for generating a network control policy provided in this embodiment of the present application should fall within the protection scope of the present application. Details are not described herein.

Specifically, as explained in step S203, the network status information has time validity. Correspondingly, the network status data also has time validity, that is, there may be network status data and network status information of a current moment, and there may also be network status data and network status information of a historical moment.

Specifically, the network status data includes the current status data of the network, and the network status information includes the current status information of the network. Based on the method provided in the foregoing embodiment, this embodiment of the present application provides another optional implementation manner:

Before the estimating network status information according to the network status data in S203, the method further includes: sending a status acquisition command; and receiving the current status data of the network acquired according to the status acquisition command.

Correspondingly, the estimating network status information according to the network status data in S203 includes: estimating the current status information of the network according to the current status data of the network. The current status information of the network includes a current link status of the network, a current network element queue status in the network, and a current data flow distribution status of the network.

As described above, the network status information may further include historical status information of the network (similarly, the network status data may also further include historical status data of the network). Before the predicting next-moment status information of the network according to the network status information, the method may further include: obtaining the historical status information of the network from a database, where the database herein may be data information prestored in a memory.

Correspondingly, the predicting next-moment status information of the network according to the network status information includes: predicting the next-moment status information of the network according to the current status information of the network and the historical status information of the network.

Specifically, the estimating network status information according to the network status data, and predicting next-moment status information of the network according to the network status information may be implemented in the following manner:

$$\hat{S}_{t+1} = f(S_{t-\tau}, 0 \leq \tau \leq L),$$

where $\hat{S}_{t+1}$ represents the next-moment status information of the network, $S_{t-\tau}$ represents the network status information, $0 \leq \tau \leq L$, L is a time window length of the network status information, and f is a linear function or a nonlinear function.

It should be noted that the method for estimating network status information according to the network status data is relatively common in reality. Examples are used for description. For example, link availability of a switch may be estimated according to acquired data of a port counter of the switch. For another example, a delay of a switch may be estimated by using acquired data of a queue counter of the switch. For still another example, a quantity of active data flows in a network is estimated by using acquired data of a flow table of a switch. A person skilled in the art should understand specific details about the estimation method, and the details do not need to be described herein.

Figure 4:
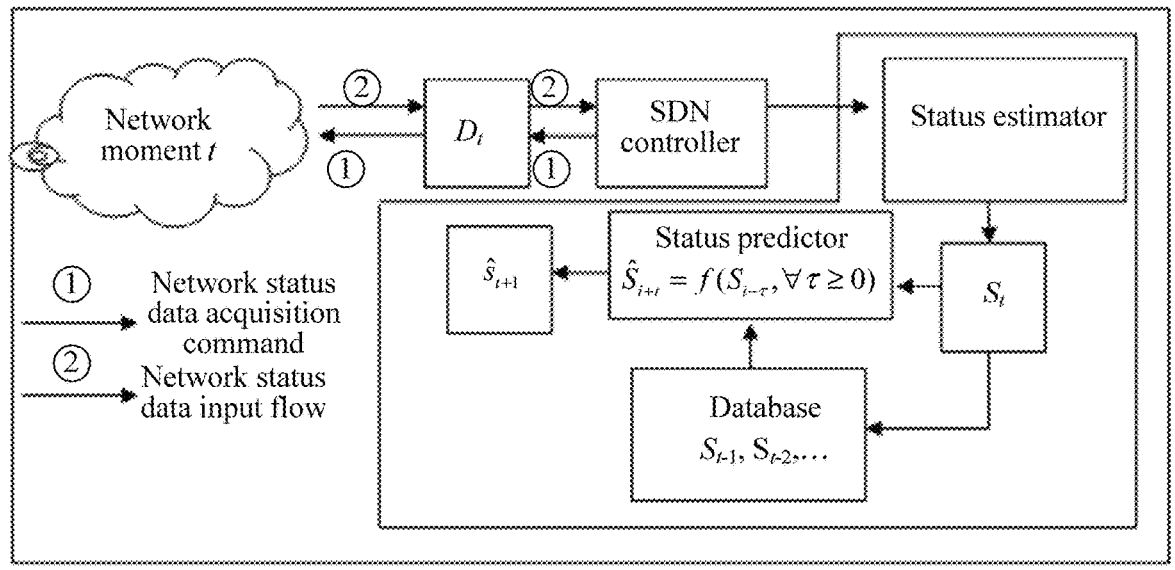
FIG. 4 is another diagram of executing the method for generating a network control policy according to the first embodiment of the present application.

Specifically, the foregoing solution may be implemented based on the structure shown in FIG. 4. For example, the SDN controller sends a network status data acquisition command (which is represented by a line segment ① in the figure) to the network in real time, periodically, or when triggered by an event. The SDN controller collects the acquired network status data $D_t$, and forwards (which is represented by a line segment ② in the figure) $D_t$ to a corresponding processing apparatus, which is referred to as a status estimator in the example of FIG. 4. The status estimator estimates network status information $S_t$ according to $D_t$. $S_t$ herein is used to represent the current status information of the network, and $S_t$ is used as an input of a status predictor (in another embodiment, $S_t$ and historical status information $S_{t-1}$, $S_{t-2}$, ... of the network from the database are used together as an input of the status predictor). The status predictor performs prediction according to the foregoing input information, to obtain next-moment status information $\hat{S}_{t+1}$ of the network. A specific prediction method may be the foregoing method. A specific expression function form off herein is not limited herein. It should be noted that, what is obtained through prediction according to the network status information of the current moment, or according to the network status information of the current moment and the network status information of the historical moment, is not necessarily only network status information of the next moment. It may also be network status information of next two moments, three moments, or the like. This status information may be referred to as future-moment status information, whose prediction principle is the same as that of the next-moment status information. In addition, as shown in FIG. 4, $S_t$ obtained through estimation is stored in the database, and specifically, may be stored in a cache or a memory of the database, to form historical status information of the network to be used for the next moment.

It should be noted that the structure shown in FIG. 4 is an example of the method, and is not used as the only structure limitation. Generation of a network control policy, network control, or the like performed according to the method 200 for generating a network control policy provided in this embodiment of the present application should fall within the protection scope of the present application. Details are not described herein.

Specifically, preprocessing the data flow to obtain a preprocessing result of the data flow in S205 may be implemented according to the following method:

extracting a feature of the data flow, where the feature includes but is not limited to a packet header 5-tuple, a packet length sequence, or a packet arrival time interval sequence;

performing spatial-temporal data mining processing and/or causal relationship analysis processing on the data flow by using the feature, to obtain a processing result; and labeling the data flow according to the processing result, to obtain a label of the data flow. The label of the data flow is the preprocessing result of the data flow. The preprocessing result may be the label, and the label herein may be an identifier, or another related mark used to distinguish a flow type and/or an inter-flow relationship.

Specifically, generating a control action by using a current network control policy and according to the network status information, the next-moment status information of the network, and the preprocessing result of the data flow in step S207 may be specifically implemented in the following manner:

$$a_i \sim \pi_t(a|s_t, \hat{s}_{t+1}, l_i),$$

where $\hat{S}_{t+1}$ represents the next-moment status information of the network, $S_t$ represents the network status information, $l_i$ represents the label of the data flow, i represents an $i^{th}$ data flow, $\pi_t$ represents the current network control policy, $\pi_t(a|s_t, \hat{S}_{t+1}, l_i)$ represents probability distribution of a under the current network control policy using $\hat{S}_{t+1}$, $S_t$, and $l_i$ as conditional variables, a is a control variable, and random sampling is performed in the probability distribution of the control variable a, to obtain the control action $a_i$.

Figure 5:
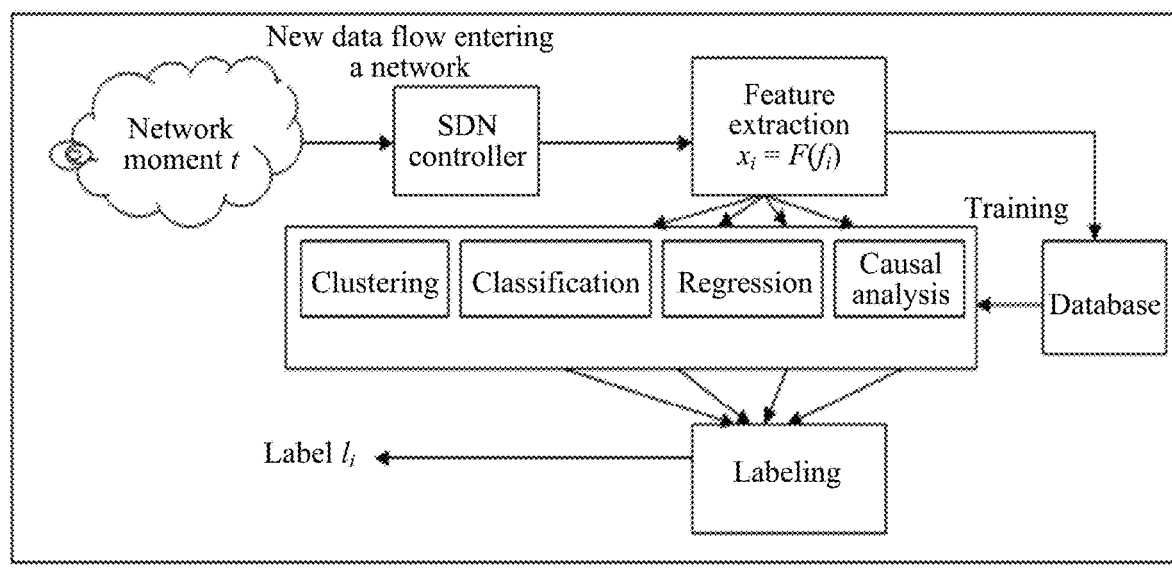
FIG. 5 is still another diagram of executing the method for generating a network control policy according to the first embodiment of the present application.

Specifically, the foregoing solution may be implemented based on the structure shown in FIG. 5. For example, the SDN controller forwards a data flow currently entering the network to a corresponding processing apparatus, which is referred to as a feature extraction module in the example of FIG. 5. The feature extraction module extracts a feature of the data flow, and performs spatial-temporal data mining processing and/or causal relationship analysis processing by using the extracted feature. The following operation may be specifically performed:

extracting the feature of the data flow, where feature extraction may be specifically performed by using $X_i=F(f_i)$, $f_i$ represents an $i^{th}$ data flow, F represents a feature extraction function, and $X_i$ represents a feature vector extracted from the $i^{th}$ data flow; the extracted feature is represented by using X, and X is a multidimensional vector shown as follows: $X=\{x_1, x_2 \ldots x_n\}^T$.

For example, spatial-temporal information included in a feature extracted from the data flow may include but is not limited to:
a source IP address, which is a 32-bit binary string;
a destination IP address, which is a 32-bit binary string;
a server port identifier, which is a 16-bit binary string;
a client port identifier, which is a 16-bit binary string;
a transmission protocol, which is of a category type;
a sending time, which is of a real number type;
a packet length sequence, which is of an integer type;
a packet arrival time interval sequence, which is of a real number type; and the like.

A specific method for the preprocessing includes: spatial-temporal data mining and/or causal relationship mining about the data flow.

The spatial-temporal data mining specifically includes but is not limited to:

Clustering: A whole set of features or a partial set of features extracted from the data flow is used as a feature vector, to represent the data flow, and clustering is performed on the feature vector, to obtain spatial-temporal information of the data flow. For example, co-flow information may be obtained by means of clustering, that is, it may be analyzed which data flows may belong to a same task.

Classification: Data flows may usually be classified according to properties of the data flows. For example, data flows may be classified into elephant flows and mouse flows according to data flow length (size) or duration. For another example, data flows may be classified into video streams, data backups, and the like according to applications in which the data flows are generated. Training data may be obtained by means of offline manual labeling. A classifier may be trained according to the training data. Data flows are classified online in real time by using the classifier.

Regression: Regression has similarities with classification, that is, a function g is obtained through learning according to training data. The function g uses a feature as an input, and the function g outputs a feature of the data flow. For example, a regression model may be established, to estimate a length of the data flow by using a feature of the data flow.

The causal relationship mining includes but is not limited to:

Causal analysis: A causal relationship may further exist between data flows. For example, some clients may send some requests to a server side, and the server side correspondingly makes a response. In this case, data flows sent from the clients to the server side and data flows sent from the server side to the clients may have a causal relationship. Assuming it is researched whether there is a causal relationship between data flows sent between a pair of IP addresses (Source IP, Destination IP) frequently communicating with each other in a network, research time may be divided into multiple time segments. $x_{(Source\ IP,\ Destination\ IP)}^t$ is defined as a quantity of data flows that are sent from the SourceIP to the DestinationIP in a t time segment. It is researched whether there is a causal relationship between $x_{(Source\ IP1,\ Destination\ IP1)}^t$ and $x_{(Source\ IP2,\ Destination\ IP2)}^{t-\tau}$, $\tau \geq 0$: $x_{(Source\ IP2,\ Destination\ IP2)}^{t-\tau} \rightarrow ? x_{(Source\ IP1,\ Destination\ IP1)}^t$.

By means of the foregoing processing, a processing result is obtained, and the data flow is labeled according to the processing result, to obtain the label $l_i$ shown in the figure, that is, a preprocessing result of the data flow.

It should be noted that the structure shown in FIG. 5 is an example of the method, and is not used as the only structure limitation. Generation of a network control policy, network control, or the like performed according to the method 200 for generating a network control policy provided in this embodiment of the present application should fall within the protection scope of the present application. Details are not described herein.

Embodiment 2

Figure 6:
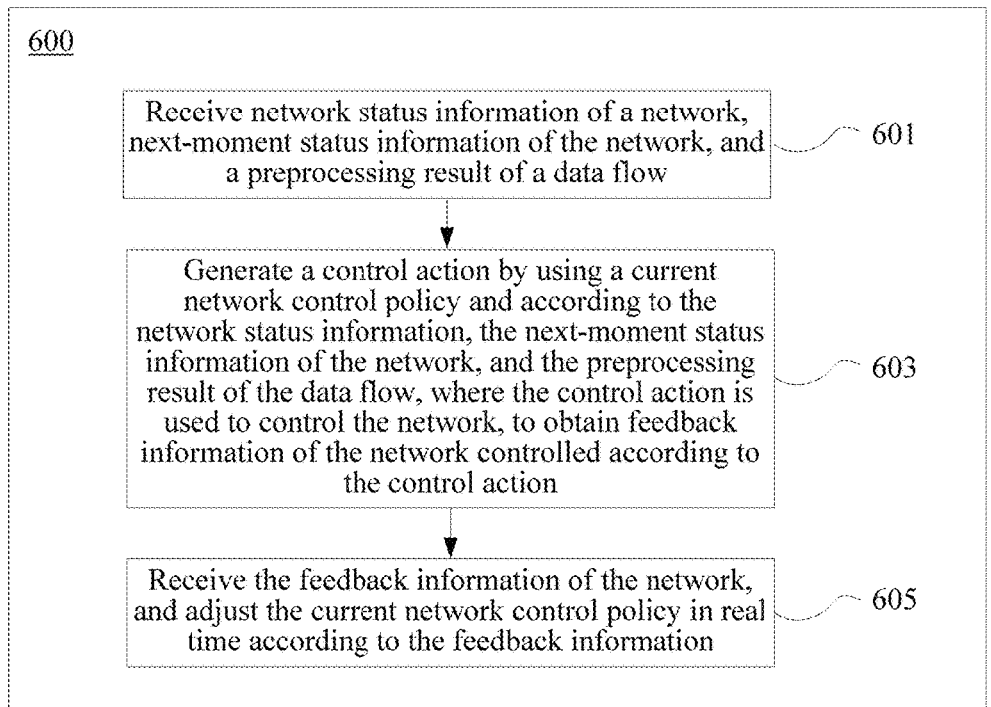
FIG. 6 is a flowchart of a method for generating a network control policy according to a second embodiment of the present application.

FIG. 6 is a schematic flowchart of a method 600 for generating a network control policy according to this embodiment of the present application. The method 600 for generating a network control policy may be applied to an SDN network.

S601. Receive network status information of the network, next-moment status information of the network, and a preprocessing result of a data flow.

The network status information is used to describe network link status of the network, network element queue status in the network, and network data flow distribution status of the network. The next-moment status information of the network is obtained through prediction according to the network status information, and the preprocessing result of the data flow is obtained by preprocessing a data flow currently entering the network.

S603. Generate a control action by using a current network control policy and according to the network status information, the next-moment status information of the network, and the preprocessing result of the data flow.

The control action is used to control the network, to obtain feedback information of the network controlled according to the control action.

S605. Receive feedback information of the network, and adjust the current network control policy in real time according to the feedback information, to obtain a next-moment network control policy.

Specifically, the next-moment status information of the network is obtained through prediction according to the network status information, and a method for the prediction may be specifically:

$$\hat{S}_{t+1} = f(S_{t-\tau}, 0 \leq \tau \leq L),$$

where $\hat{S}_{t+1}$ represents the next-moment status information of the network, $S_{t-\tau}$ represents the network status information, $0 \leq \tau \leq L$, L is a time window length of the network status information, and f is a linear function or a nonlinear function.

Specifically, the preprocessing result of the data flow is obtained by preprocessing the data flow currently entering the network, and a method for the preprocessing may be specifically:

extracting a feature of the data flow, where the feature includes a packet header 5-tuple, a packet length sequence, or a packet arrival time interval sequence;

performing spatial-temporal data mining processing and/or causal relationship analysis processing on the data flow by using the feature, to obtain a processing result; and labeling the data flow according to the processing result, to obtain the preprocessing result of the data flow.

In this embodiment of the present application, network status information, next-moment status information of a network, and a preprocessing result of a data flow are received. A control action is generated according to a current network control policy and based on the network status information, the next-moment status information of the network, and the preprocessing result of the data flow. The control action is used to control the network, to obtain feedback information obtained by controlling the network according to the control action. Finally, the feedback information is received, and the current network control policy is adjusted in real time according to the feedback information, to obtain a next-moment network control policy. When next network data arrives, this process is repeated. Finally, based on next feedback information, the network control policy obtained after the current real-time adjustment is further adjusted in real time, to obtain a network control policy for a further next moment, and the process is repeated. In this way, a network control policy is always dynamically optimized and adjusted in real time according to a current data and network status, and this is the so-called self-adaption herein. For each moment, there is an optimal network control policy needed by the network and data at the moment. The network is controlled according to the network control policy updated in real time, to improve network control efficiency.

Specifically, the foregoing embodiment may be implemented based on the structure shown in FIG. 3. For example, in a control system 300, a complete solution implementation process may be as follows:

A network status data acquisition command is periodically or randomly triggered to be sent to a network. An SDN controller collects network status data based on the command and forwards the network status data to a corresponding processing apparatus. The corresponding processing apparatus estimates network status information according to the network status data, and predicts next-moment status information of the network according to the network status information. It should be noted that, corresponding to the next-moment status information of the network, the network status information herein is used to describe network status information different from that of the next moment, for example, historical status information of the network or current status information of the network.

At a time sequence the same as, earlier than, or later than that of actions such as network status data collection and network status information estimation, the SDN controller forwards, to another corresponding processing apparatus in real time, a data flow currently entering the network. The corresponding processing apparatus preprocesses the data flow currently entering the network, to obtain a preprocessing result of the data flow. It is emphasized that the action of preprocessing the data flow may be performed simultaneously with, earlier than, or later than the actions of estimating the network status information and predicting the next-moment status information of the network, because in running of an actual solution, there is no extra limitation on the sequence of the actions originally. Therefore, the foregoing actions performed according to any sequence are within the protection scope of this embodiment of the present application. Details are not described herein.

The network status information, the next-moment status information of the network, and the preprocessing result of the data flow are used as input information of a control module. In addition, the control module invokes a current network control policy in a cache or a memory, generates a control action according to the current network control policy by using information such as the network status information, the next-moment status information of the network, and the preprocessing result of the data flow, and outputs the control action to the SDN controller. The SDN controller executes a specific control command on the network according to the control action. The network feeds back a control effect as feedback information to the SDN controller, where the control effect is generated according to the control action. The SDN controller forwards the feedback information to the control module. The control module adjusts the current network control policy in real time according to the feedback information, to obtain a next-moment network control policy, and the cache of the control module temporarily stores the next-moment network control policy, or stores the next-moment network control policy in the memory, for use in a next circulation. In this way, a control action generated in the first circulation is an optimal control action needed by the network for this circulation moment or period.

After the control action is executed, feedback information of this time is generated. A next-moment network control policy is obtained according to the feedback information. The next-moment network control policy enters a next circulation as a current network control policy in the next circulation. In this way, the second circulation, the third circulation, the fourth circulation, and the like are carried out subsequently, to ensure that each current moment has optimal control for a network status and data flow information at the current moment, to improve control efficiency of the entire control system. Details are not described herein. The method provided in this embodiment of the present application may be executed by the control module in the structure 300.

Figure 7:
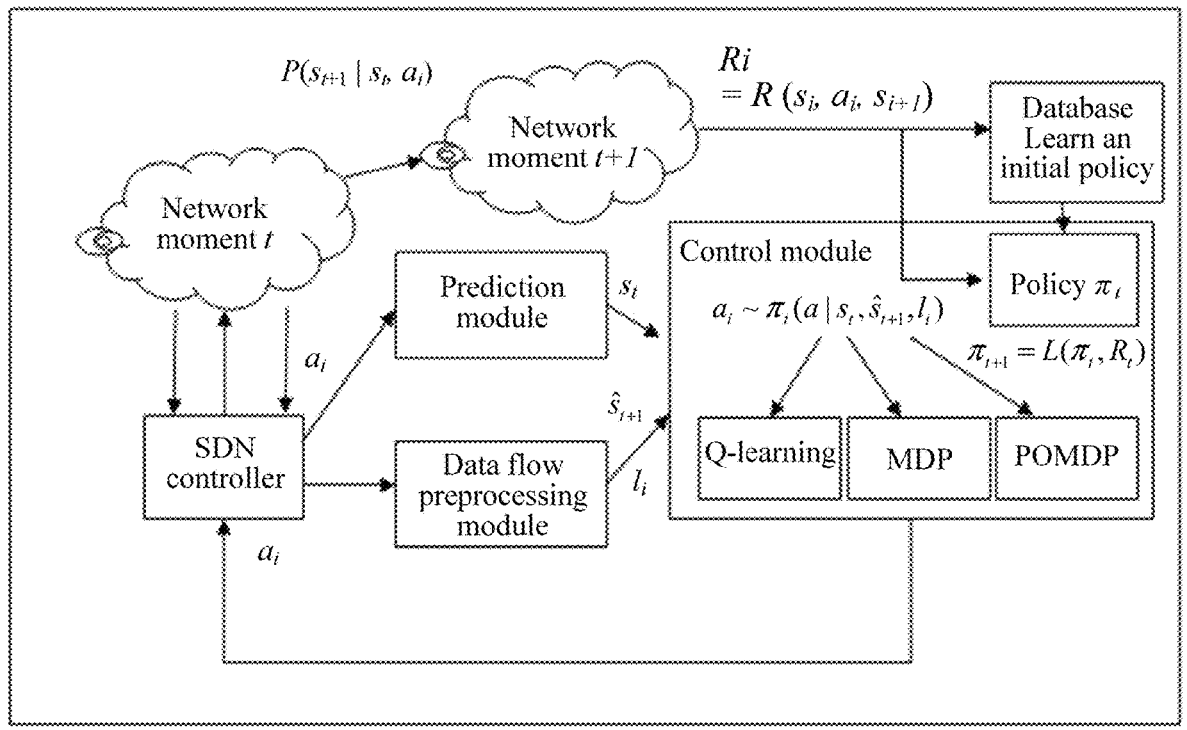
FIG. 7 is a diagram of executing the method for generating a network control policy according to the second embodiment of the present application.

More specifically, the foregoing solution may further be implemented based on the structure shown in FIG. 7. For example, the control module receives network status information, next-moment status information of the network, and a preprocessing result of a data flow, generates a control action $a_i$ according to an invoked policy $\tau_t$ and received information. Specifically, the following manner may be used: $a_i \sim \pi_t(a|s_t, \hat{s}_{t+1}, l_i)$, where $\hat{S}_{t+1}$ represents the next-moment status information of the network, $S_t$ represents the network status information, $l_i$ represents a label of the data flow, i represents an $i^{th}$ data flow, $\pi_t$ represents the current network control policy, $\pi_t(a|s_t, \hat{s}_{t+1}, l_i)$ represents probability distribution of a under the current network control policy using $\hat{S}_{t+1}$, $S_t$, and $l_i$ as conditional variables, a is a control variable. Random sampling is performed in the probability distribution of the control variable a, to obtain the control action $a_i$, and the control action $a_i$ obeys probability distribution of $\pi_t(a|s_t, \hat{s}_{t+1}, l_i)$ Specifically, a method of Q-learning, or a Markov decision process (MDP), or a partially observable Markov decision process (POMDP) shown in the figure may be used for implementation.

The control action a, is sent to the SDN controller and is used to enable the SDN controller to execute the control action. When receiving the control action $a_i$ and transiting from a state $S_t$ to an actual state $S_{t+1}$, the network feeds back, to the control module, a return $R_t=R(s_t, a_t, s_{t+1})$ generated by the control action, and the return is referred to as feedback information. Further, the control module correspondingly adjusts the policy $\pi_t$ in real time according to the feedback information, to obtain a next-moment network control policy:

$$\pi_{t+1} = L(\pi_t, R_t),$$

where L represents a learning algorithm for adjusting the policy by using the feedback, and $\pi_{t+1}$ is the next-moment network control policy.

Specifically, S is a finite network status information set, A is a finite control action set, $J(\pi)$ represents a target function for measuring policy superiority, $P(s_{t+1}|s_t, a_t)$ is a probability of transiting from the state $S_t$ to the state $S_{t+1}$ under the influence of an action at $R(s_t, a_t, s_{t+1})$ is the return obtained when the system transits from the state $S_t$ to $S_{t+1}$, $\pi(a|s)$ is a policy function, representing a probability that the control action a is used in a network status s described by the network status information, and $\mu_\pi(s)$ is distribution of the state s under the policy $\pi$.

An optimal policy may be obtained by using the following constraint optimization equations:

$$\max_{\pi,\mu_\pi} J(\pi) = \max_{\pi,\mu_\pi} \int \int_{S \times A} \pi(a|s)\mu_\pi(s)R(s_t, a_t, s_{t+1})dads,$$

$$\text{s.t.} \int \int_{S \times A} \pi(a|s)\mu_\pi(s)dsda = 1,$$

$$\int \int_{S \times A} P(s'|s, a)\pi(a|s)\mu_\pi(s)dsda = \mu_\pi(s').$$

Assume that data collected offline during initialization is:

$$(s_0, a_0, s'_0, R_0), (s_1, a_1, s'_1, R_1), \Lambda, (s_n, a_n, s'_n, R_n)$$

An initial network control policy $\pi_0$ is obtained through learning. The system controls running of the network during initialization by using the network control policy $\pi_0$. When sufficient new data sets are collected, a new network control policy $\pi_1$ is obtained through learning by using the new data sets. The process is constantly circulated (this circulation process may be performed offline or online), till a good enough network control policy can be used as the current network control policy in the foregoing method 200 or 600. Then, the first circulation in the embodiment provided above is entered.

Optionally, as shown in FIG. 7, in this embodiment of this solution, the feedback information may be stored in a cache or a memory of the control module. Details are not described herein again.

It should be noted that the structures shown in FIG. 3 and FIG. 7 are examples of the method, and are not used as the only structure limitation. Generation of a network control policy, network control, or the like performed according to the method 600 for generating a network control policy provided in this embodiment of the present application should fall within the protection scope of the present application. Details are not described herein.

Embodiment 3

Figure 8:
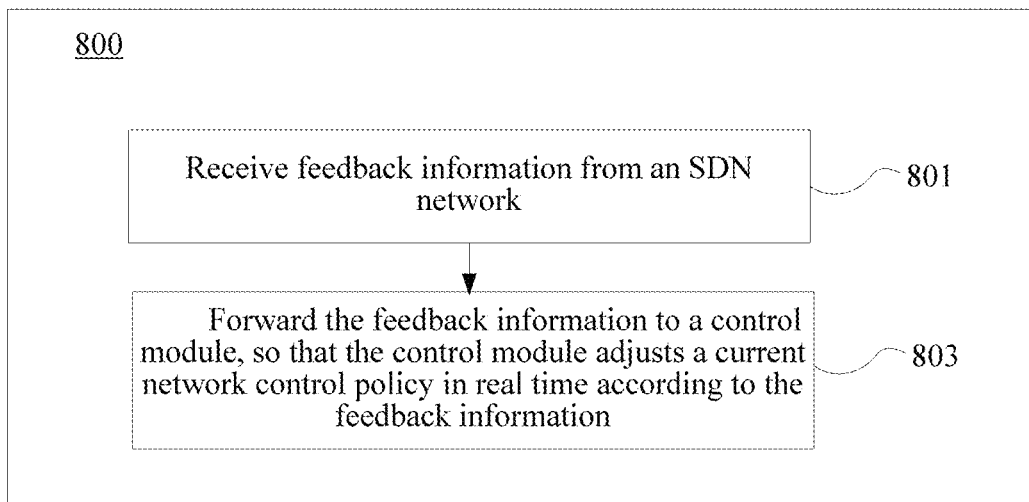
FIG. 8 is a flowchart of a method for generating a network control policy according to a third embodiment of the present application.

FIG. 8 is a schematic flowchart of a method 800 for generating a network control policy according to this embodiment of the present application. The method 800 for generating a network control policy may be applied to an SDN network.

S801. Receive feedback information from the network.

S803. Forward the feedback information to a control module, so that the control module adjusts a current network control policy in real time according to the feedback information, to obtain a next-moment network control policy.

In this embodiment of the present application, feedback information is received, and the feedback information is forwarded to a control module, so that the control module adjusts a current network control policy in real time according to the feedback information, to obtain a next-moment network control policy. When next network data arrives, this process is repeated. Finally, based on next feedback information, the network control policy obtained after the current real-time adjustment is further adjusted in real time, to obtain a network control policy for a further next moment, and the process is repeated. In this way, a network control policy is always dynamically optimized and adjusted in real time according to a current data and network status, and this is the so-called self-adaption herein. For each moment, there is an optimal network control policy needed by the network and data at the moment. The network is controlled according to the network control policy updated in real time, to improve network control efficiency.

Specifically, the foregoing embodiment may be implemented based on the structure shown in FIG. 3. For example, in a control system 300, a complete solution implementation process should be: A network status data acquisition command is periodically or randomly triggered to be sent to a network. An SDN controller collects network status data based on the command and forwards the network status data to a corresponding processing apparatus. The corresponding processing apparatus estimates network status information according to the network status data, and predicts next-moment status information of the network according to the network status information. It should be noted that, corresponding to the next-moment status information of the network, the network status information herein is used to describe network status information different from that of the next moment, for example, historical status information of the network or current status information of the network.

At a time sequence the same as, earlier than, or later than that of actions such as network status data collection and network status information estimation, the SDN controller forwards, to another corresponding processing apparatus in real time, a data flow currently entering the network. The corresponding processing apparatus preprocesses the data flow currently entering the network, to obtain a preprocessing result of the data flow. It is emphasized that the action of preprocessing the data flow may be performed simultaneously with, earlier than, or later than the actions of estimating the network status information and predicting the next-moment status information of the network, because in running of an actual solution, there is no extra limitation on the sequence of the actions originally. Therefore, the foregoing actions performed according to any sequence are within the protection scope of this embodiment of the present application. Details are not described herein.

The network status information, the next-moment status information of the network, and the preprocessing result of the data flow are used as input information of a control module. In addition, the control module invokes a current network control policy in a cache or a memory, generates a control action according to the current network control policy by using information such as the network status information, the next-moment status information of the network, and the preprocessing result of the data flow, and outputs the control action to the SDN controller. The SDN controller executes a specific control command on the network according to the control action. The network feeds back a control effect as feedback information to the SDN controller, where the control effect is generated according to the control action. The SDN controller forwards the feedback information to the control module. The control module adjusts the current network control policy in real time according to the feedback information, to obtain a next-moment network control policy, and the cache of the control module temporarily stores the next-moment network control policy, or stores the next-moment network control policy in the memory, for use in a next circulation. In this way, a control action generated in the first circulation is an optimal control action needed by the network for this circulation moment or period.

After the control action is executed, feedback information of this time is generated. A next-moment network control policy is obtained according to the feedback information. The next-moment network control policy enters a next circulation as a current network control policy in the next circulation. In this way, the second circulation, the third circulation, the fourth circulation, and the like are carried out subsequently, to ensure that each current moment has optimal control for a network status and data flow information at the current moment, to improve control efficiency of the entire control system. Details are not described herein. The method provided in this embodiment of the present application may be executed by the SDN controller in the structure 300.

Embodiment 4

Figure 9:
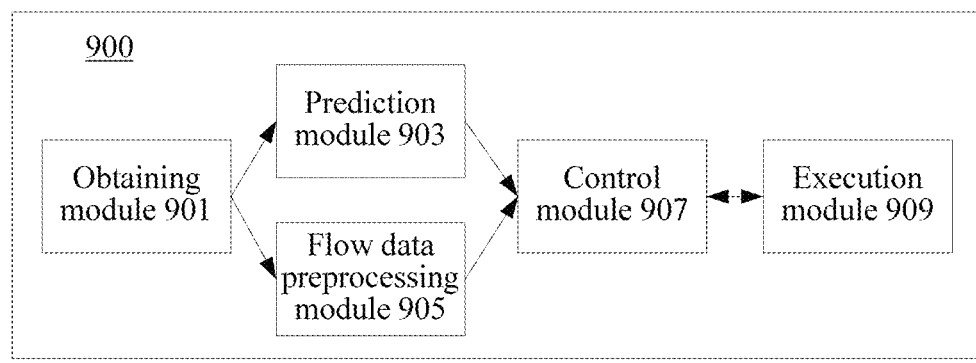
FIG. 9 is a functional block diagram of an apparatus for generating a network control policy according to an embodiment of the present application.

FIG. 9 is a functional block diagram of an apparatus 900 for generating a network control policy according to this embodiment of the present application. The apparatus 900 for generating a network control policy may be applied to an SDN network.

An obtaining module 901 is configured to obtain network status data of the network.

The network status data is original data used to represent a network status.

A prediction module 903 is configured to: estimate network status information according to the network status data, and predict next-moment status information of the network according to the network status information. The network status information is used to describe a network link status of the network, a network element queue status in the network, and a network data flow distribution status of the network.

It should be noted that the network status information having a high-level physical meaning is estimated from the network status data having a low-level physical meaning. The network status information has time validity. In other words, network status information at a moment t (which may be referred to as a current moment) describes network link status, network element queue status in the network, network data flow distribution status, and the like of the t moment. Network status information at a moment t−1 (which may be referred to as a historical moment) describes network link status, network element queue status in the network, network data flow distribution status, and the like of the t−1 moment. Network status information at a moment t+1 (which may be referred to as a next moment or a future moment) describes network link status, network element queue status in the network, network data flow distribution status, and the like of the t+1 moment. Details are not described herein.

A flow data preprocessing module 905 is configured to receive a data flow currently entering the network, and preprocess the data flow, to obtain a preprocessing result of the data flow.

A control module 907 is configured to generate a control action by using a current network control policy and according to the network status information, the next-moment status information of the network, and the preprocessing result of the data flow.

An execution module 909 is configured to control the network according to the control action, and obtain feedback information of the network controlled according to the control action.

The control module 907 is further configured to receive the feedback information of the network, and adjust the current network control policy in real time according to the feedback information, to obtain a next-moment network control policy.

It should be noted that the execution module 909 and the obtaining module 901 may be implemented by same hardware, or may be implemented by different hardware. The obtaining module 901 may be implemented by independent software, and the execution module 909 may be a functional unit in an SDN controller.

In this embodiment of the present application, next-moment status information of a network is predicted according to network status information. A data flow currently entering the network is preprocessed, to obtain a preprocessing result of the data flow. A control action is generated according to a current network control policy, and based on the network status information, the next-moment status information of the network, and the preprocessing result of the data flow. The network is controlled according to the control action, to obtain feedback information, where feedback information is obtained by controlling the network according to the control action. Finally, the current network control policy is adjusted in real time according to the feedback information, to obtain a next-moment network control policy. When next network data arrives, this process is repeated. Finally, based on next feedback information, the network control policy obtained after the current real-time adjustment is further adjusted in real time, to obtain a network control policy for a further next moment, and the process is repeated. In this way, a network control policy is always dynamically optimized and adjusted in real time according to a current data and network status, and this is the so-called self-adaption herein. For each moment, there is an optimal network control policy needed by the network and data at the moment. The network is controlled according to the network control policy updated in real time, to improve network control efficiency.

Specifically, the network status data may include current status data of the network. Correspondingly, the network status information may include current status information of the network. The prediction module 903 may be specifically configured to: send a status acquisition command; receive the current status data of the network acquired according to the status acquisition command; and estimate the current status information of the network according to the current status data of the network. The current status information of the network includes a current link status of the network, a current network element queue status in the network, and a current data flow distribution status of the network.

Specifically, the network status information may further include historical status information of the network (correspondingly, the network status data may further include historical status data of the network). The prediction module 903 is further configured to: obtain the historical status information of the network from a database, and predict the next-moment status information of the network according to the current status information of the network and the historical status information of the network.

Specifically, the prediction module may be specifically configured to execute an operation of $\hat{S}_{t+1}=f(S_{t-\tau}, 0 \leq \tau \leq L)$, where $\hat{S}_{t+1}$ represents the predicted next-moment status information of the network, $S_{t-\tau}$ represents the network status information, $0 \leq \tau \leq L$, L is a time window length of the network status information, and f is a linear function or a nonlinear function.

In an optional implementation solution, the flow data preprocessing module 905 may specifically include:

an extraction unit, configured to extract a feature of the data flow, where the feature includes a packet header 5-tuple, a packet length sequence, or a packet arrival time interval sequence;

a mining analysis unit, configured to perform spatial-temporal data mining processing and/or causal relationship analysis processing on the data flow by using the feature, to obtain a processing result; and a labeling unit, configured to label the data flow according to the processing result, to obtain a label of the data flow, where the label of the data flow is the preprocessing result of the data flow.

In an optional implementation solution, the control module may be specifically configured to perform the following operation:

$a_i \sim \pi_t(a|s_t, \hat{s}_{t+1}, l_i)$, where $\hat{S}_{t+1}$ represents the next-moment status information of the network, $S_t$ represents the network status information, $l_i$ represents the label of the data flow, i represents an $i^{th}$ data flow, $\pi_t$ represents the current network control policy, $\pi_t(a|s_t, \hat{s}_{t+1}, l_i)$ represents probability distribution of a under the current network control policy using $\hat{S}_{t+1}$, $S_t$, and $l_i$ as conditional variables, a is a control variable. Random sampling is performed in the probability distribution of the control variable a, to obtain the control action $a_i$.

Embodiment 5

Figure 10:
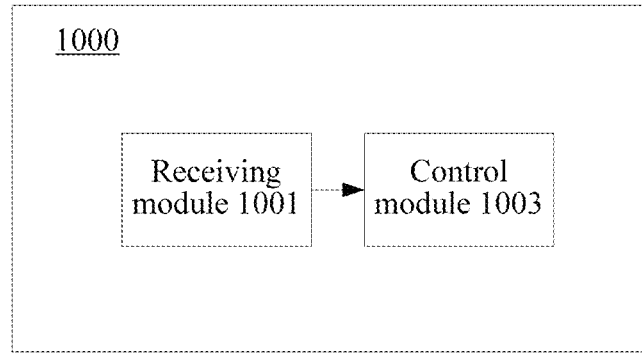
FIG. 10 is a simplified structural block diagram of an apparatus for generating a network control policy according to an embodiment of the present application.

FIG. 10 is a structural block diagram of an apparatus 1000 for generating a network control policy according to this embodiment of the present application.

A receiving module 1001 is configured to receive network status information of a network, next-moment status information of the network, and a preprocessing result of a data flow. The network status information is used to describe network link status of the network, network element queue status in the network, and network data flow distribution status of the network. The next-moment status information of the network is obtained through prediction according to the network status information, and the preprocessing result of the data flow is obtained by preprocessing a data flow currently entering the network.

A control module 1003 is configured to generate a control action by using a current network control policy and according to the network status information, the next-moment status information of the network, and the preprocessing result of the data flow. The control action is used to control the network, to obtain feedback information of the network controlled according to the control action.

The control module 1003 is further configured to receive the feedback information of the network, and adjust the current network control policy in real time according to the feedback information, to obtain a next-moment network control policy.

In this embodiment of the present application, network status information, next-moment status information of a network, and a preprocessing result of a data flow are received. A control action is generated according to a current network control policy and based on the network status information, the next-moment status information of the network, and the preprocessing result of the data flow. The control action is used to control the network, to obtain feedback information obtained by controlling the network according to the control action. Finally, the feedback information is received, and the current network control policy is adjusted in real time according to the feedback information, to obtain a next-moment network control policy. When next network data arrives, this process is repeated. Finally, based on next feedback information, the network control policy obtained after the current real-time adjustment is further adjusted in real time according to corresponding network status information and data flow status at that time, and the process is repeated. In this way, a network control policy is always dynamically optimized and adjusted in real time according to a current data and network status, and this is the so-called self-adaption herein. For each moment, there is an optimal network control policy needed by the network and data at the moment. The network is controlled according to the network control policy updated in real time, to improve network control efficiency.

That the next-moment status information of the network is obtained through prediction according to the network status information is specifically:

$\hat{S}_{t+1}=f(S_{t-\tau}, 0 \leq \tau \leq L)$, where $\hat{S}_{t+1}$ represents the predicted next-moment status information of the network, $S_{t-\tau}$ represents the network status information, $0 \leq \tau \leq L$, L is a time window length of the network status information, and f is a linear function or a nonlinear function.

The preprocessing result of the data flow is obtained by preprocessing a data flow currently entering the network. The preprocessing specifically includes:

extracting a feature of the data flow, where the feature includes a packet header 5-tuple, a packet length sequence, or a packet arrival time interval sequence;

performing spatial-temporal data mining processing and/or causal relationship analysis processing on the data flow by using the feature, to obtain a processing result; and labeling the data flow according to the processing result, to obtain a label of the data flow, where the label of the data flow is the preprocessing result of the data flow.

The apparatus 1000 provided in this embodiment of the present application may be a network controller, which may be used in an SDN network. The network controller is configured to receive feedback information from the SDN network, and forward the feedback information to a control module. The control module adjusts a current network control policy in real time according to the feedback information, to obtain a next-moment network control policy. The feedback information is obtained by controlling the network according to a control action generated by the control module during running of the network at a previous moment.

It should be noted that the apparatuses provided in all the foregoing apparatus embodiments may be configured to implement the methods provided in all the foregoing method embodiments. Similarly, the methods provided in all the foregoing method embodiments may run in the apparatuses provided in all the foregoing apparatus embodiments. Detailed information in the solutions that are described in the method embodiments may be used to explain corresponding features in the apparatus embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for use by a network controller of a network, comprising:

collecting network status data of a current moment;

estimating network status information of the current moment according to the network status data of the current moment, wherein the network status information of the current moment comprises network link status at the current moment, network element queue status at the current moment, and network data flow distribution status at the current moment;

predicting network status information of a next moment according to at least the network status information of the current moment, wherein the predicted network status information of the next moment comprises network link status at the next moment, network element queue status at the next moment, and network data flow distribution status at the next moment;

receiving and preprocessing a data flow entering the network at the current moment, to obtain a preprocessing result of the data flow;

generating a control action by using a network control policy of the current moment and according to the network status information of the current moment, the predicted network status information of the next moment, and the preprocessing result of the data flow;

obtaining feedback information of the network resulted from the control action; and generating a network control policy of the next moment by adjusting the network control policy of the current moment according to the feedback information.

2. The method according to claim 1, wherein before estimating the network status information of the current moment according to the network status data of the current moment, the method further comprises:
   sending a status data acquisition command; and
   receiving the network status data of the current moment acquired according to the status data acquisition command.

3. The method according to claim 2, wherein before predicting the network status information of the next moment according to the network status information of the current moment, the method further comprises:
   obtaining historical network status information from a database;
   and wherein predicting the network status information of the next moment according to at least the network status information of the current moment comprises:
   predicting the network status information of the next moment according to the network status information of the current moment and the historical network status information.

4. The method according to claim 1, wherein the network status information of the next moment is predicted according to:

$$\hat{S}_{t+1} = f(S_{t-\tau}, 0 \leq \tau \leq L),$$

where $\hat{S}_{t+1}$ represents the network status information at the next moment t+1, $S_{t-\tau}$ represents the network status information at a moment t−τ up to the current moment t, 0≤τ≤L, L is a time window length of the network status information, and f is a linear function or a nonlinear function.

5. The method according to claim 1, wherein preprocessing the data flow entering the network at the current moment, to obtain a preprocessing result of the data flow comprises:
   extracting a feature of the data flow;
   performing spatial-temporal data mining processing and/or causal relationship analysis processing on the data flow by using the feature, to obtain a processing result; and
   labeling the data flow according to the processing result, to obtain a label of the data flow, wherein the label of the data flow is the preprocessing result of the data flow;
   wherein the feature of the data flow is one of: a packet header 5-tuple, a packet length sequence, or a packet arrival time interval sequence.

6. The method according to claim 5, wherein the control action generated by using the network control policy of the current moment and according to the network status information of the current moment, the predicted network status information of the next moment, and the preprocessing result of the data flow is:

$$a_i \sim \pi_t(a|s_t, \hat{s}_{t+1}, l_i),$$

where $\hat{S}_{t+1}$ represents the network status information of the next moment, $S_t$ represents the network status information of the current moment, $l_i$ represents a label of the $i^{th}$ data flow, $\pi_t$ represents the network control policy at the current moment, a is a control variable, $\pi_t(a|s_t, \hat{s}_{t+1}, l_i)$ represents probability distribution of a under the network control policy at the current moment using $\hat{S}_{t+1}$, $S_t$, and $l_i$ as conditional variables, and random sampling is performed in the probability distribution of the control variable a, to obtain the control action $a_i$.

7. A method for use by a network controller of a network, comprising:
   obtaining network status information of the network at a current moment, network status information of the network at a next moment, and a preprocessing result of a data flow entering the network at the current moment;
   generating a control action by using a network control policy of the current moment and according to the network status information of the current moment, the network status information of the next moment, and the preprocessing result of the data flow;
   receiving feedback information of the network resulted from the control action; and
   generating a network control policy of the next moment by adjusting the network control policy of the current moment according to the feedback information;
   wherein the network status information comprises network link status of the network, network element queue status in the network, and network data flow distribution status of the network, and
   wherein the network status information of the next moment is obtained through prediction according to the network status information of the current moment.

8. The method according to claim 7, wherein the network status information of the next moment is predicted according to:

$$\hat{S}_{t+1} = f(S_{t-\tau}, 0 \leq \tau \leq L),$$

where $\hat{S}_{t+1}$ represents the network status information at the next moment t+1, $S_{t-\tau}$ represents the network status information at a moment t−τ up to the current moment t, 0≤τ≤L, L is a time window length of the network status information, and f is a linear function or a nonlinear function.

9. The method according to claim 7, wherein the preprocessing result of the data flow is obtained by preprocessing the data flow centering the network at the current moment, and preprocessing the data flow comprises:
   extracting a feature of the data flow;
   performing spatial-temporal data mining processing and/or causal relationship analysis processing on the data flow by using the feature, to obtain a processing result; and
   labeling the data flow according to the processing result, to obtain a label of the data flow, wherein the label of the data flow is the preprocessing result of the data flow;
   wherein the feature of the data flow is one of: a packet header 5-tuple, a packet length sequence, or a packet arrival time interval sequence.

10. A network controller of a network, comprising:
    a networking interface and a processor coupled to the networking interface;
    wherein the networking interface is configured to:
       receiving network status data of a current moment; and
       receiving a data flow entering the network at the current moment;
    wherein the processor is configured to:
       estimating network status information of the current moment according to the network status data of the current moment, wherein the network status information of the current moment comprises network link status at the current moment, network element queue status at the current moment, and network data flow distribution status at the current moment;

predicting network status information of a next moment according to at least the network status information of the current moment, wherein the predicted network status information of the next moment comprises network link status at the next moment, network element queue status at the next moment, and network data flow distribution status at the next moment;

preprocessing the data flow entering the network at the current moment, to obtain a preprocessing result of the data flow;

generating a control action by using a network control policy of the current moment and according to the network status information of the current moment, the predicted network status information of the next moment, and the preprocessing result of the data flow;

obtaining feedback information of the network resulted from the control action; and generating a network control policy of the next moment by adjusting the network control policy of the current moment according to the feedback information.

11. The network controller according to claim 10, wherein before estimating the network status information of the current moment according to the network status data of the current moment the networking interface is configured to:
send a status data acquisition command; and
receive the network status data of the current moment acquired according to the status data acquisition command.

12. The apparatus according to claim 11, wherein before predicting the network status information of the next moment according to the network status information of the current moment, the processor is further configured to:
obtain historical network status information from a database;
and wherein in predicting the network status information of the next moment according to at least the network status information of the current moment, the processor is configured to:
predict the network status information of the next moment according to the network status information of the current moment and the historical network status information.

13. The network controller according to claim 10, wherein the network status information of the next moment is predicted according to:

$$\hat{S}_{t+1} = f(S_{t-\tau}, 0 \leq \tau \leq L),$$

where $\hat{S}_{t+1}$ represents the network status information at the next moment t+1, $S_{t-\tau}$ represents the network status information at a moment t−τ up to the current moment t, $0 \leq \tau \leq L$, L is a time window length of the network status information, and f is a linear function or a nonlinear function.

14. The network controller according to claim 10, wherein in preprocessing the data flow entering the network at the current moment, to obtain a preprocessing result of the data flow, the processor is configured to:
extract a feature of the data flow;
perform spatial-temporal data mining processing and/or causal relationship analysis processing on the data flow by using the feature, to obtain a processing result; and
label the data flow according to the processing result, to obtain a label of the data flow, wherein the label of the data flow is the preprocessing result of the data flow;
wherein the feature of the data flow is one of: a packet header 5-tuple, a packet length sequence, or a packet arrival time interval sequence.

15. The network controller according to claim 14, wherein the control action generated by using the network control policy of the current moment and according to the network status information of the current moment, the predicted network status information of the next moment, and the preprocessing result of the data flow is:

$$a_t \sim \pi_t(a | s_t, \hat{s}_{t+1}, l_i),$$

where $\hat{S}_{t+1}$ represents the network status information of the network of the next moment, $S_t$ represents the network status information of the next moment, $l_i$ represents a label of the $i^{th}$ data flow, $\pi_t$ represents the network control policy at the current moment, a is a control variable, $\pi_t(a|s_t, \hat{s}_{t+1}, l_i)$ represents probability distribution of a under the network control policy at the current moment using $\hat{S}_{t+1}$, $S_t$, and $l_i$ as conditional variables, and random sampling is performed in the probability distribution of the control variable a, to obtain the control action $a_t$.

16. A network controller of a network, comprising:
a networking interface;
a memory storing a program; and
a processor coupled to the networking interface and the memory;
wherein the program, when executed by the processor, causes the network controller to:
obtain network status information of the network at a current moment, network status information of the network at a next moment, and a preprocessing result of a data flow entering the network at the current moment;
generate a control action by using a network control policy of the current moment and according to the network status information of the current moment, the network status information of the next moment, and the preprocessing result of the data flow;
receive feedback information of the network resulted from the control action; and
generate a network control policy of the next moment by adjusting the network control policy of the current moment according to the feedback information;
wherein the network status information comprises network link status of the network, network element queue status in the network, and network data flow distribution status of the network, and
wherein the network status information of the next moment is obtained through prediction according to the network status information of the current moment.

17. The network controller according to claim 16, wherein that the network status information of the next moment is predicted according to:

$$\hat{S}_{t+1} = f(S_{t-\tau}, 0 \leq \tau \leq L),$$

where $\hat{S}_{t+1}$ represents the network status information of the next moment t+1, $S_{t-\tau}$ represents the network status information at a moment t−τ up to the current moment t, $0 \leq \tau \leq L$, L is a time window length of the network status information, and f is a linear function or a nonlinear function.

18. The network controller according to claim 16, wherein that the preprocessing result of the data flow is obtained by preprocessing the data flow entering the network at the current moment, and in preprocessing the data flow, the program causes the network controller to:

extract a feature of the data flow;
perform spatial-temporal data mining processing and/or causal relationship analysis processing on the data flow by using the feature, to obtain a processing result; and
label the data flow according to the processing result, to obtain a label of the data flow, wherein the label of the data flow is the preprocessing result of the data flow;
wherein the feature of the data flow is one of: a packet header 5-tuple, a packet length sequence, or a packet arrival time interval sequence.

* * * * *